(12) United States Patent
Rosser

(10) Patent No.: US 6,750,919 B1
(45) Date of Patent: Jun. 15, 2004

(54) EVENT LINKED INSERTION OF INDICIA INTO VIDEO

(75) Inventor: Roy J. Rosser, Princeton, NJ (US)

(73) Assignee: Princeton Video Image, Inc., Lawrenceville, NJ (US)

(*) Notice: Subject to any disclaimer, the term of this patent is extended or adjusted under 35 U.S.C. 154(b) by 0 days.

(21) Appl. No.: 09/600,768
(22) PCT Filed: Jan. 22, 1999
(86) PCT No.: PCT/US99/01399
§ 371 (c)(1),
(2), (4) Date: Jul. 21, 2000
(87) PCT Pub. No.: WO99/38320
PCT Pub. Date: Jul. 29, 1999

Related U.S. Application Data

(60) Provisional application No. 60/072,354, filed on Jan. 23, 1998.

(51) Int. Cl.[7] .............................. H04N 9/74; H04N 9/76
(52) U.S. Cl. ........................ 348/584; 348/589; 348/600
(58) Field of Search ................................. 348/563, 564, 348/565, 566, 569, 584, 589, 598, 600, 578, 581, 582; 345/629, 631, 632, 634, 635, 637; H04N 5/445, 9/74, 9/76

(56) References Cited

U.S. PATENT DOCUMENTS

| | | |
|---|---|---|
| 5,264,933 A | 11/1993 | Rosser et al. |
| 5,488,675 A | 1/1996 | Hanna |
| 5,491,517 A | 2/1996 | Kreitman et al. |
| 5,543,856 A | 8/1996 | Rosser et al. |
| 5,594,509 A | 1/1997 | Florin et al. |
| 5,600,368 A * | 2/1997 | Matthews, III ............. 348/143 |
| 5,627,915 A | 5/1997 | Rosser et al. |
| 5,923,365 A * | 7/1999 | Tamir et al. ................ 348/578 |
| 5,953,077 A * | 9/1999 | Honey et al. ............... 348/589 |
| 6,297,853 B1 * | 10/2001 | Sharir et al. ................ 348/589 |

* cited by examiner

Primary Examiner—Sherrie Hsia
(74) Attorney, Agent, or Firm—Synnestvedt, Lechner & Woodbridge, LLP; Richard C. Woodbridge, Esq; Roy Rosser

(57) ABSTRACT

This invention relates to a system and method for placing event related information into a video broadcasting so that the added information does not interfere with or obscure the primary action of interest in the broadcast. The disclosed information could be implemented by using instructions from an event information gathering system to trigger the display of one of an appropriate set of pre-rendered animations in the broadcast video via a well known live video insertion system (48). The disclosed invention envisages the animation sequence having at least two parts (FIG. 4), namely a core or base sequence (34) which is always used, and a mid or a variable sequence (56, 58, 60) which is changed according to the actual data that needs to be displayed. The live video insertion system data (48) and processing may be used to perform occlusion, and/or tracking to either make the event information display look as if it is part of the scene, or merely to occlude the display when event action would otherwise be obscured, or to turn off or reposition, or resize the display when event action otherwise be obscured.

13 Claims, 4 Drawing Sheets

EVENT LINKED INSERTION OF INDICIA INTO VIDEO

CROSS-REFERENCES TO RELATED APPLICATIONS

This application claims the benefit of U.S. Provisional Application No. 60/072,354, filed Jan. 23, 1998.

BACKGROUND OF THE INVENTION

1. Field of the Invention

This invention relates to electronic devices for inserting images into live video signals, particularly to such systems adapted to be capable of rapidly inserting different indicia into video dependent on some event which may or may not be related to the video content, such as, but not limited to, the speed of the pitch in a baseball match, or the current value of a stock market index.

2. Description of the Related Art

Electronic devices for inserting images into live video signals, such as described in U.S. Pat. No. 5,264,933 by Rosser, et. al., U.S. Pat. No. 5,488,675 by Hanna and U.S. Pat. No. 5,491,517 by Kreitman et. al., have been developed and used for the purpose of inserting advertising and other indicia into broadcast events, primarily sports events. These devices are capable of seamlessly and realistically incorporating logos or other indicia into the original video in real time, even as the original scene is zoomed, panned or otherwise altered in size and perspective.

Sports broadcasters are constantly looking for ways to make television sports viewing more compelling to viewers. One way to enhance a viewer's enjoyment of a game or contest is to provide statistics about the game such as, but not limited to, the current score; the time elapsed, the time of the game remaining; the speed an object is thrown, hit or served; the distance a ball or object is thrown, hit or served; the time taken for an object or player to move from one point to the next; the distance a football team has to go to achieve a First Down; the current position of an Offside Line in soccer; and so on. As long as there is a means to measure a statistic in a reasonable time (e.g., clock, stop watch, radar or JUGGS gun, a GPS position measurement, a marker that can be observed automatically or by a person, etc.), that statistic can be used by the broadcaster to enhance the game. Such information is routinely displayed in television broadcasts as a static or animated overlay by means of such well-known keying devices as the Chyron Corporation's INFINIT® family of character generators. The problem with adding in an overlay is that the video image becomes cluttered—and rather than enhancing a viewer's enjoyment of a game, too much information presented overlaid over the video of the game begins to diminish the viewing experience. In particular, such overlays can obscure some of the action of the game.

SUMMARY OF THE INVENTION

This current invention solves the problem of how to add information to a sports broadcast without introducing undesirable image clutter. Briefly described, the preferred embodiment of the invention uses a modified live video insertion system to display the information not as an overlay but in a way that the inserted information indicia looks as if it is actually part of the original scene being televised. In this way the sports fan sees the game action with the added statistical information looking like a scoreboard or sign in the stadium itself. Most importantly, by displaying the additional information in the background, if the action of the game moves into that region of the image, the viewer sees the players and the action moving in front of the inserted information.

Alternative embodiments of the present invention permit displaying the information indicia in a manner in which it is obviously not part of the original scene being televised, similarly to the conventional manner depicted in FIG. 2. However, an important distinction over this prior art is that this alternative embodiment displays the information indicia in the background so that action occurring in the game occludes it. Further alternative embodiments, rather than performing occlusion of the information indicia, resize or reposition the insert so as to avoid the game image from being obscured. A still further alternative embodiment would simply disable the event information display when it would otherwise obstruct the TV audience's view of the event action.

In the live video insertion systems referenced above in the Background of the Invention, the inserted indicia were static images, pre-prepared animation sequences or live video from another video source. Modifications to such systems are necessary to display information that only becomes available while the insertion is already in view, such as the outcome of a play being shown. The technical problem that is solved by this invention is to transition from an insert that is of a scoreboard or sign to a display of that scoreboard or sign with one of a number of possible outcomes of a play or action, while showing the play or action.

To modify the live video insertion systems as described in, for instance, in U.S. Pat. No. 5,264,933 by Rosser, et. al., U.S. Pat. No. 5,543,856 by Rosser et al. and U.S. Pat. No. 5,627,915 by Rosser et. al., all of which are hereby incorporated in this application by reference, in order to display information that is rapidly changing or dependent on the outcome of a real-time event in the stadium, there needs to be a pre-prepared animated sequence for each possible outcome or another video source trained on a scoreboard device which will show the required statistic. For instance, to be able to display the speed of the pitch in a baseball game as a background graphic, there first needs to be an inserted indicia in the field of view, which is the scoreboard or sign where the speed of the pitch will be displayed. After the pitch is thrown and the speed measured by a radar gun, such as the well known JUGGS gun, the live video insertion system either inserts a live shot of a camera trained on a scoreboard displaying the pitch speed or runs a short animation, changing or morphing from the scoreboard or sign to a rendering of the scoreboard or sign displaying the measured speed of the pitch and then morphing or changing back to a rendering of the original scoreboard or sign. Since a reasonable baseball pitch in a major league game can be anywhere from 70 to 99 miles per hour, there are 30 possible outcomes, one of which has to be selected within a fraction of a second by an operator.

The most obvious way to implement the invention would be to have a camera trained on a display that shows the required result or statistic, and insert this live video as the logo or indicia of the live video insertion system. Apart from the extra expense of another camera, and the need for a properly constructed model scoreboard or sign, such an obvious implementation introduces difficulties of synching the video and of framing the edge of the shot so as to make the total insert look as if it really is part of the scene being viewed.

Another, slightly more manageable way to implement this invention is to modify live video insertion systems by adding on a random access video storage unit, such as the well-known line of AVID Inc.'s video storage devices. If this random access video storage device is supplying video to be inserted, and the random access device has a multitude of different versions of an animation of the scoreboard or sign, one of which shows one of the possible outcomes to be shown, then all the operator has to do is to select and activate the correct animation sequence into the live video insertion system unit on cue. In the baseball speed of the pitch example, the random access video storage unit would need to have thirty different animations stored, one showing each of the possible speeds from 70 to 99 mph as the mid point of the animation. This way, the television viewer will initially see a scoreboard or background in the field of view. As soon as the pitch speed is known, and the appropriate animation is activated by the operator or automatically by the live video insertion system reading the output from the radar gun, the viewer will see the scoreboard or sign animate to display the speed of the pitch and then animate back to being a scoreboard or sign in the background. There are technical difficulties and costs associated with this simple implementation of the invention. In particular, having a large number of complete animations on such an external storage device is expensive in memory, and introduces timing and synchronization difficulties.

A more elegant way to implement the invention is to use simpler, multi threaded animations, in which there is a core sequence with a number of optional mid sequence variations, each of which may be a short animation or may be as simple as a single animation frame. For instance one implementation of the baseball speed of the or current score of another game or other information that the viewer would like to see without being distracted from the flow of the game they are currently watching.

BRIEF DESCRIPTION OF THE DRAWINGS

The present invention can be better understood with reference to the following figures in which like numerals shall represent like elements in the various figures.

DETAILED DESCRIPTION OF THE INVENTION

Figure 1:
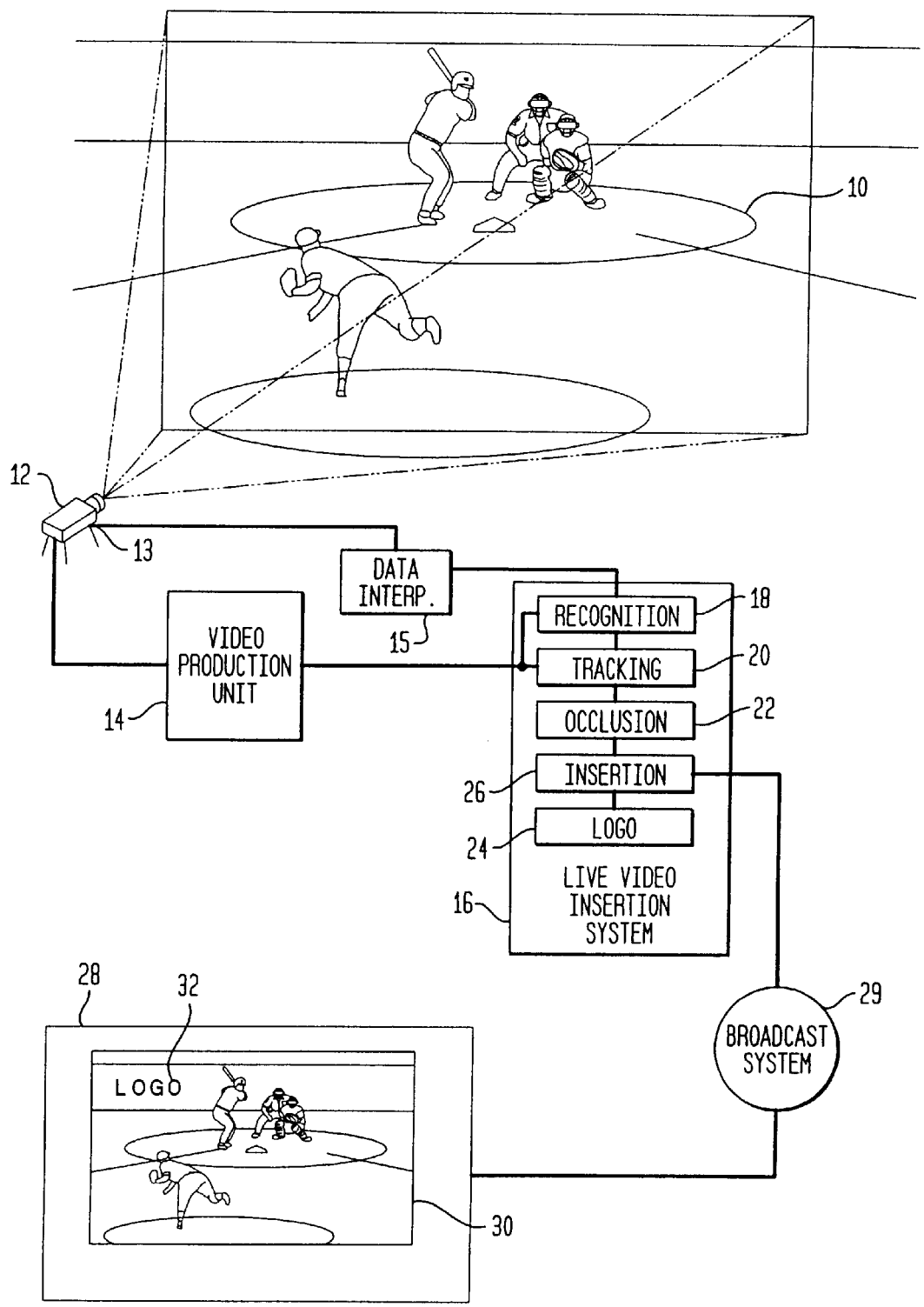
FIG. 1 is a schematic representation of a conventional live video insertion system.

The present invention shall now be described with reference to the accompanying figures. As depicted in FIG. 1 a video transmission, which may, for example be a live television broadcast of an event being played on field 10, is captured for remote viewing by television cameras 12, and is composed into a program for viewing within a standard video production unit 14, which may be a television production truck or a video studio, equipped with well known video production equipment. After being composed into a program, the video is fed through a live video insertion system 16. The live video insertion system unit 16 performs the functions of recognition using the recognition unit 18, tracking using the tracking unit 20, occlusion mask production using the occlusion mask production unit 22 and then pitch display has a core sequence which shows a flat sign rotating to reveal what is on the back of it. Each of the mid sequence variations is a single field showing the back of the sign with one of the thirty possible pitch speeds. Instead of 30 animation clips, a single main animation with thirty, one-field mid sequence variations is all that is required. Such an animation is sufficiently small that it can be stored in the internal random access memory of a live video insertion system unit, and be under direct control of that system's operational software, making it not only less expensive, but also simplifying the synchronization and timing issues.

One intended use of live video insertion systems is to create virtual billboards in the broadcasted video signal. One of the paradox's of the virtual billboard function of a live video insertion system is that, to the television audience, it inserts artificial or virtual signage into video images in a way that makes the sign look as if it really is part of the stadium or venue from which the broadcast is being sent. However, in order to make the insertion more valuable to the advertiser, it is desirable to draw attention to the insertion. One way to do this is to make the insertion appear to be an animated object, such as, but not limited to, a rotating sign. The motion of such a moving sign draws viewer's attention to the insertion. Broadcasters and sports fans, on the other hand, find such arbitrary motion distracting from the game.

An additional benefit of the present invention in which a live video insertion system is used to display sports information is that it increases the value of the signage for the advertiser. Making the sign animate in such a way that it displays information that is linked to the game, and adds to the understanding or enjoyment of the game satisfies both the advertiser's desire for visibility and the broadcaster/sports fan wanting to enhance the game.

It may also be in the interest of both advertisers, the broadcasters and the sports fans, to make the sign animate to display information which may not be related to the game or event being televised, but is of interest to the viewer watching the game, such as, but not limited to the closing price of the Dow Jones Index, the results performs mixing 24 of the logo into the main video using the insertion unit 26, as discussed in detail in U.S. Pat. Nos. 5,264,933, 5,543,856 and 5,627,915 referenced above, as well as allowed, co-pending U.S. patent application Ser. No. 08/563,598 filed Nov. 28, 1995, U.S. Pat. No. 5,892,554, entitled "SYSTEM AND METHOD FOR INSERTING STATIC AND DYNAMIC IMAGES INTO A LIVE VIDEO BROADCAST"; Ser. No. 08/662,089 filed Jun. 12, 1996, U.S. Pat. No. 5,953,076, entitled "SYSTEM AND METHOD OF REAL-TIME INSERTIONS INTO VIDEO USING ADAPTIVE OCCLUSION WITH A SYNTHETIC COMMON REFERENCE IMAGE", and co-pending provisional patent application Ser. No. 60/031,883 filed Nov. 27, 1996 entitled "CAMERA TRACKING USING PERSISTENT, SELECTIVE IMAGE TEXTURE TEMPLATES", the teachings of which are hereby included by reference.

The recognition and tracking parameters may also be provided by sensors 13 attached to the camera itself, and interpreted by a camera head data interpreter 15, as used by some virtual reality studio systems, and as discussed in co-pending U.S. patent application Ser. No. 09/604,976, entitled "IMAGE INSERTION IN VIDEO STREAMS USING A COMBINATION OF PHYSICAL SENSORS AND PATTERN RECOGNITION", the teachings of which are hereby included by reference.

A viewer watching the broadcast on a well known television set 28 will see the image of the game 30 into which the inserted indicia 32 has been placed to look as if it really is in the stadium, and which changes size, shape and position appropriately as the image of the game 30 is panned, zoomed and otherwise altered in perspective, and is properly occluded by players or other objects from the game moving in front of it.

Figure 2:
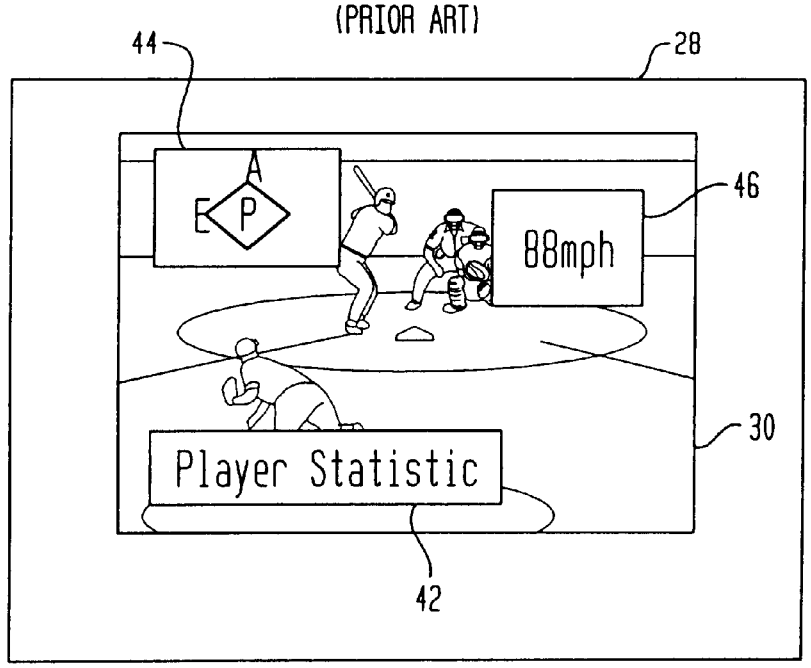
FIG. 2 illustrates a video scene in which additional information has been conventionally overlaid onto the video.

In FIG. 2 a television video image 30 of a sporting event has a graphic overlay 42 showing current game statistics, which may be the current score, a graphic overlay 44 showing the state of play, which may be a graphic indicating the position of players on the field, and a graphic overlay 46 showing the speed of the pitch. Each of these conventional graphic overlays 42, 44, and 46 has been put in by well-known video keying devices such as the Chyron Corporation's INFINIT® family of character generators. All these well-know video keying devices make their insertions in a fixed region of the television image and are not responsive to motion of objects within the video image itself. Moreover, the graphic overlays obsure objects in the video, which is why the clutter the produce can become detracting to the viewer, despite their providing extra information about the game.

Figure 3:
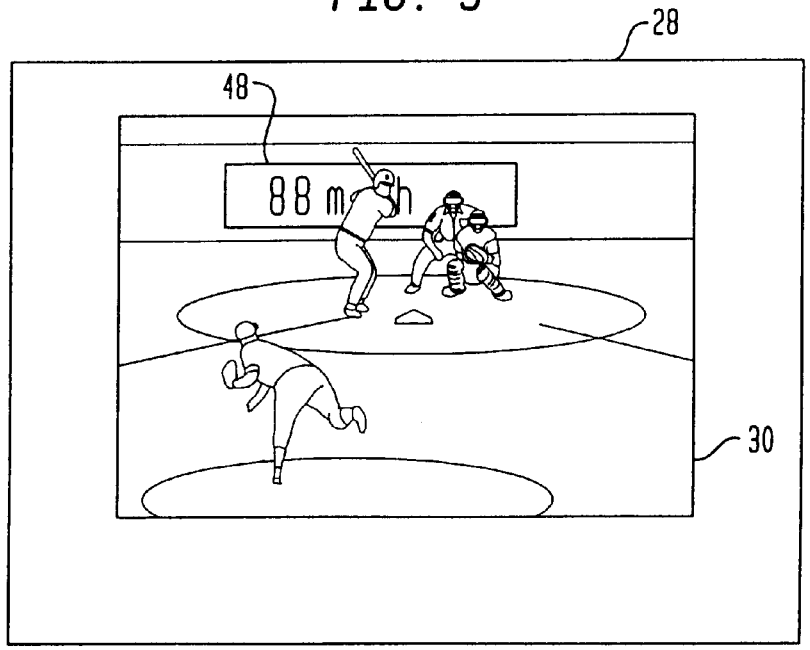
FIG. 3 illustrates a video scene in which additional information has been added into the scene via the preferred embodiment of the present invention.

In FIG. 3 a television video image 40 of a sporting event has extra information displayed on an live video insertion system insert 48, which appears to be a sign board attached to the stadium back wall. This insert 48 moves and adjusts size and shape to maintain the illusion that it is part of the back wall as the television video image 40 is panned, zoomed and otherwise adjusted. This insert 48 is also properly occluded, meaning that when players, or other objects in the game, move in front of it, the insertion 48 allows the players or objects to be displayed in their entirety, exactly as if the player or object has really moved in front of the sign. This occlusion of the live video insertion system's insert 48 is what allows the extra information to be conveyed to the fan while minimizing the disruption of the viewing experience.

Although it is possible to implement the invention by having a camera trained on a display that shows the required result or statistic, and insert this live video as an live video insertion system insert, this introduces the extra cost of another camera, the need for a properly constructed model scoreboard or sign, and added difficulties of synching the video and of framing the edge of the shot so as to make the total insert look as if it really is part of the scene being viewed.

Another, slightly more manageable way to implement this invention is to modify the live video insertion system by adding on a well known random access video storage unit, such as one of AVID Inc.'s video storage devices. If this random access video storage device is supplying video to the live video insertion system, and the random access device has a multitude of different versions of an animation of the score board or sign, one of which shows one of the possible outcomes to be shown, then all the operator has to do is to select and activate the correct animation sequence into the live video insertion system on cue. There are technical difficulties and costs associated with this simple implementation of the invention. In particular, having a large number of complete animations on such an external storage device is expensive in memory, and introduces timing and synchronization difficulties.

Figure 4:
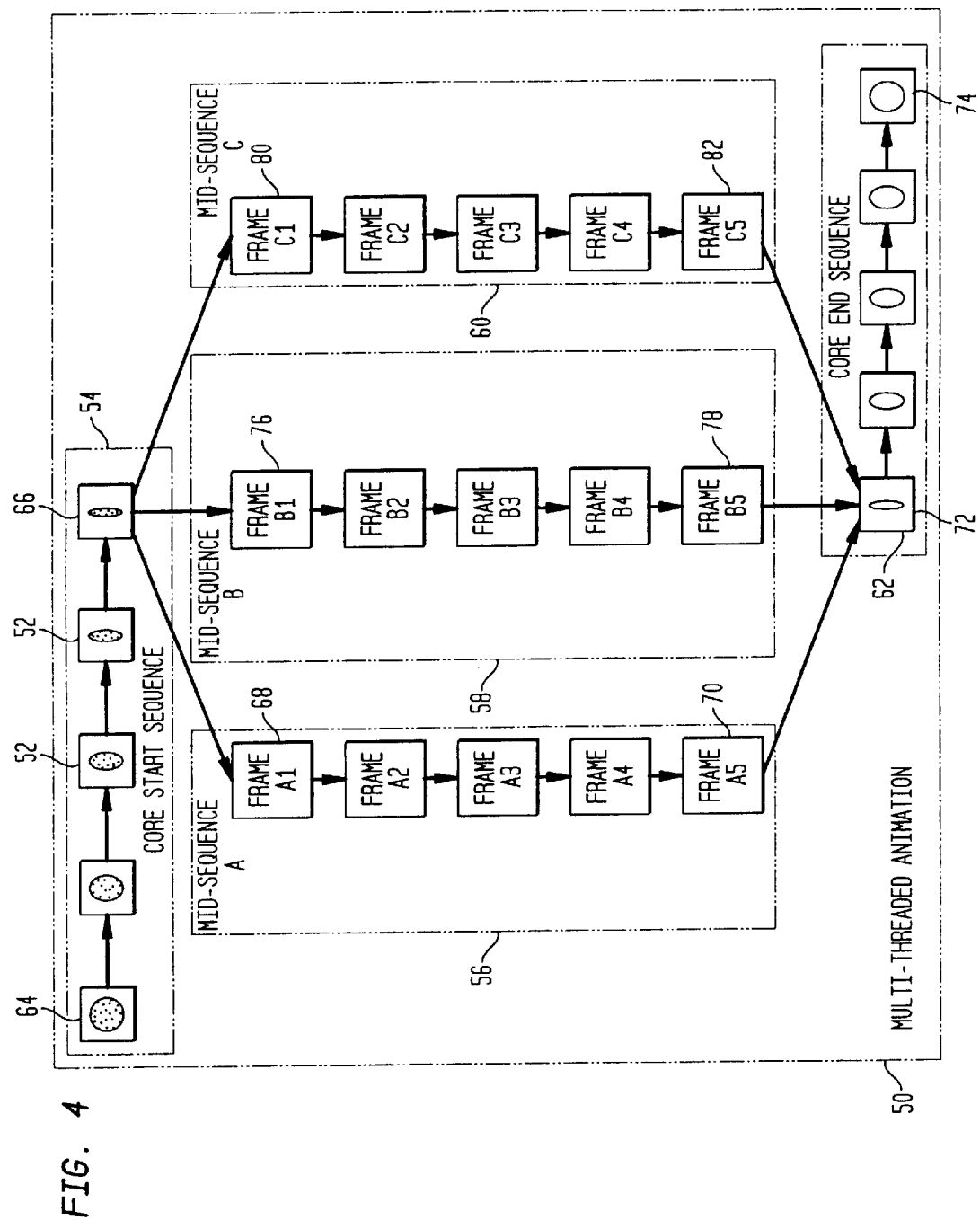
FIG. 4 is a schematic representation of a multi-threaded animation sequence.

For these reasons, the preferred method of implementation of the invention makes use of simpler, multi threaded animations 50, as shown diagrammatically in FIG. 4. The multi-threaded animation 50 consists, in general, of a core start sequence 54, a number of mid sequences 56, 58 and 60 and an end sequence 62, all of which are made up of a sequence of individual video frames 52. The mid sequence animations 56, 58 and 60 represent the possible outcomes of the event being broadcast. One way in which the system works is by having the first frame 64 as a static animation, which may represent a score board or an advertising sign, or any other suitable object for showing the added information on. When the event occurs, which may for instance be a football field goal attempt, and the kick is either good or bad, the live video insertion system operator activates, via the usual live video insertion system control interface, the animation selecting the appropriate mid-sequence animation. For instance if the kick is good, the selected animation would start at the first frame 64 of the core start animation sequence 54 and run through, displaying each frame 52 of the core start animation sequence 54 for a predetermined time which may be as short as a single field of video. The core start animation sequence 54 may, for instance, represent a signboard rotating to reveal the other side. When the final frame 66 of the core start animation sequence 54 is reached, the animation then jumps to a start frame 68, 76 or 80 of one of the of mid sequence animations 56, 58 and 60 that has been determined or chosen as being appropriate for the kick being good. If the kick were bad, or a two-point conversion was scored, then the appropriate mid sequence animation would be chosen instead. At the end frame 70, 78 or 82 of whichever of the mid sequence animations 56, 58 or 60 that has been shown, the animation then jumps to the first field 72 of the core end animation sequence 62 and runs through, displaying each of the animation frames 52 for a predetermined length of time, until it reaches the end frame 74 of the core end animation sequence.

The key idea of the multi-threaded animations 50 is that the total number of animation frames is kept relatively small even if there are a large number of mid-sequence animations. By keeping the total animation small, it is possible to have all the animation frames stored in memory as part of the logo 24 of the live video insertion system. For instance a current version of live video insertion system used in live broadcast by the assignee of the present invention, PVI Inc., has sufficient memory to store forty 120 by 90 pixel full color images with attached keys. Having the complete set of possible animations stored on such an internal memory significantly reduces the cost of the system and makes control of it significantly easier.

If powerful enough computers or other information manipulating devices, are used, or the graphic or animation is simple enough, or only part of the animation needs to be changed, the mid-sequences 56, 58 and 60 can be created after the event related information is captured. They may even be created while the core start sequence 54 is being displayed. This results in an even greater saving of computer memory. The appropriate mid-sequence animation 56, 58 or 60 may be created in its entirety or by compositing critical information, such as the digits representing a speed or other statistic, onto a pre-rendered image or animation sequence.

Obviously the idea of multi-threaded animations 50 can be implemented in many different ways, including but not limited to, having the initial insertion displayed be an animation sequence, comprising the core start animation sequence 54 frames, which are displayed sequentially in a continuous loop, until such time as the operator or the system calls for a jump to one of the of mid sequence animations 56, 58 and 60 that is appropriate for action that has just occurred, or information that has become available.

The possible statistics about the game that may be displayed by such a multi-thread animation of the preferred embodiment of the present invention include, but are not limited to, the current score, the time elapsed, the time of the game remaining, the speed an object is thrown, hit or served, the distance a ball or object is thrown, hit or served, the time taken for an object or player to move from one point to the next and so on. As long as there is a means, such as clock, stop watch, radar gun, a marker that can be observed automatically or by a person, to measure a statistic in a reasonable time, that statistic can be displayed by the preferred embodiment of the present invention. Such information is routinely displayed in television broadcasts as a static or animated overlay by means of such well-known keying devices as the Chyron Corporation's INFINIT® family of character generators, and is therefore often made available over standard data buses or in standard machine readable form.

Figure 5:
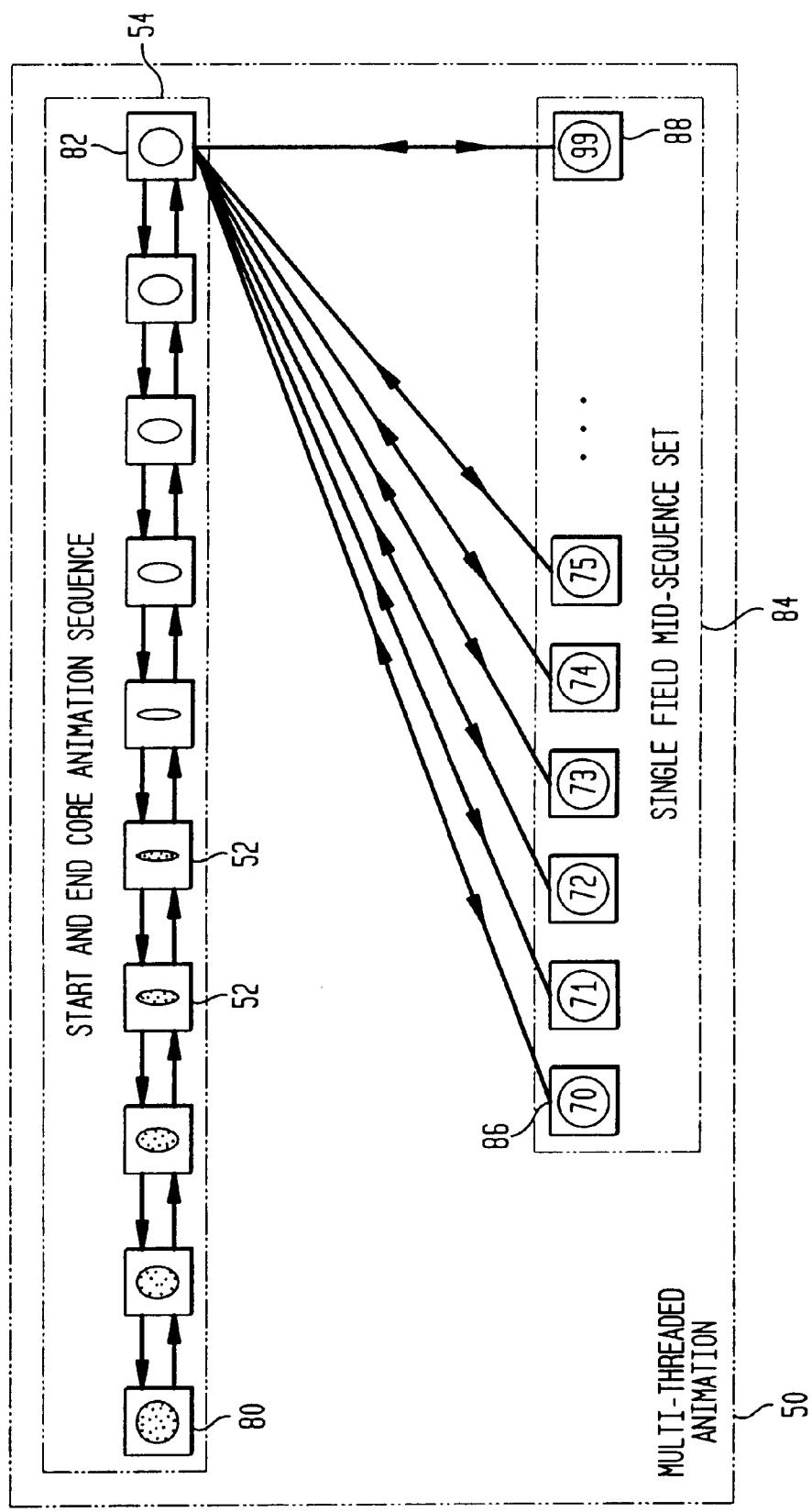
FIG. 5 is a schematic representation of a multi-threaded animation sequence in which the mid-sequence variations are a single animation frame.

A second example will serve to illustrate more fully the advantages of the multi-threaded animation 50 of the present invention. In a baseball game, it is of interest to viewers of the game to be able to see the speed of the pitch. Since a reasonable baseball pitch in a major league game can be anywhere from 70 to 99 miles per hour, there are 30 possible outcomes, one of which has to be selected within a fraction of a second by an operator and displayed. By having the version of the multi-threaded animation 50 shown in FIG. 5, in which the core animation sequence 54 is a ten frame animation used both as a start and end core animation sequence, and the set of mid sequence animations 84 consists of thirty single-field animations, each one corresponding to one of the possible pitch speeds of interest in a major league broadcast, starting with the lowest value of 70 mph on frame 86 to the highest value of 99 mph on frame 88, the entire multi-threaded animation is only 40 fields.

Although the exact number of fields is only important for specific memory constraints, the set up illustrates the tremendous compression achieved by the multi-threaded animation 50. Such a set up could obviously be adapted to either show information other than the speed of the pitch in a baseball game, or to show similar information in a variety of other sports broadcasts. One way the baseball speed of the pitch would work, is to have frame 80, the first frame of the core animation sequence be displayed as a normal inserted indicia of a live video insertion system onto the back wall behind a batter. This inserted indicia, frame 80, which is the scoreboard or sign where the speed of the pitch will be displayed, is positioned so as to be in the field of view in a usual camera shot of the event. After the pitch is thrown and the speed measured by a radar gun, such as the well known JUGGS gun, the information from the JUGGs gun is either feed directly to the live video insertion system in some appropriate machine readable encoding, or is conveyed to the operator. On receiving the information, the operator either pushes a key or the system interprets the data, and the insertion unit 26 causes the core animation sequence 54 frames to be displayed as the insert, beginning with the start frame 80 and running to the end frame 82, showing each of the intermediate animation frames 52 in turn for a predetermined number of video fields. The animation that this results in being displayed as the live video insertion system's insertion may for instance be an image of a scoreboard or sign changing or morphing in a particular fashion, such as, but not limited to be a sign rotating round to reveal the back of the sign. The final frame 82 of the core animation sequence 54 may represent the back of the sign but with nothing on it. The next frame displayed is then one of the thirty single frames of the set of mid sequence animations 84, each of which displays the back of the sign with a number corresponding to a pitch speed, in miles per hour, from 70 to 99. This frame is displayed for a predetermined, operator variable, number of fields, after which the insertion unit 26 causes the final frame 82 of the core animation sequence 54 to be displayed. The animation then runs backward to the start frame 80, showing each of the intermediate animation frames 52 in turn, but in reverse order to which they were originally shown, for a predetermined number of video fields.

The animation that this results in being displayed as the live video insertion system's insertion may for instance be an image of a scoreboard or sign changing or morphing in a particular fashion, such as, but not limited to be a sign rotating from revealing the back of the sign round to the sign itself. The overall effect of such an animation is of a sign rotating round to reveal the speed of the pitch on the back, then rotating back again to the original sign.

In the preferred embodiment described above, the invention makes the information look as if it is part of the original video. Alternative embodiments are readily implemented wherein intelligence from the live video insertion system (to include data obtained from camera sensor devices) is used selectively. For instance, the animation or graphic displaying the event related information may remain in a fixed position of the screen, and may also remain at a fixed size with respect to the viewer's screen, but the intelligence from the live video insertion system is used to allow event related action to pass in front of the event related information display. In another alternative embodiment this intelligence may be used not to provide occlusion, but to resize or reposition the insert so as to avoid event action being obscured. In yet another alternative embodiment this intelligence may also be used to simply disable the event information display when it would otherwise obstruct the TV audience's view of the event action.

It is to be understood that the foregoing disclosure taught and described herein is illustrative of the present invention. Modifications may readily be devised by those ordinarily skilled in the art without departing from the spirit or scope of the present invention.

What is claimed is:

1. A method of displaying one or more event related statistics in a video broadcast of an event so that said event related statistic does not interfere with or obscure a primary action of interest in said broadcast, comprising the steps of:
   a. using a live video insertion system to identify a location and measure image motion in said video broadcast;
   b. generating a display animation capable of displaying said event related statistic, said display animation including a reasonable facsimile of a part of a venue in which said event being broadcast is occurring;
   c. obtaining said event related statistic;
   d. utilizing the obtained event statistic to select or create a statistic display animation using said display animation such that said statistic display animation includes said reasonable facsimile of said part of said venue;
   e. resizing said statistic display animation in accordance with zoom, pan and tilt information from said live video insertion system; and,
   f. mixing said resized statistic display animation into said broadcast video using an occlusion mask from said live video insertion system, thereby making said static display animation appear to a viewer of the broadcast to be an actual part of the event.

2. The method of claim 1 wherein the animation of step (b) comprises a static image.

3. The method of claim 1 in which said mixing in step (e) comprises moving said output display information animation so that said output display information does not obscure said primary action of interest.

4. The method of claim 1 in which step (a) comprises using physical sensors attached to at least one camera to provide data relating to said at least one camera's location, orientation and field of view.

5. An apparatus for placing one or more event related statistics in a video broadcast of an event so that said event related statistic does not interfere with or obscure the primary action of interest in said broadcast comprising:
   a live video insertion system to identify a location and measure image motion in said video broadcast;
   a generating means for generating a display animation capable of displaying said event related statistic, said display animation including a reasonable facsimile of a part of a venue in which said event being broadcast is occurring;
   an obtaining means for obtaining said event related statistic;
   a utilization means for utilizing the obtained event statistic to select or create a statistic display animation using said display animation such that said statistic display animation includes said reasonable facsimile of said part of said venue;
   resizing means for resizing said statistic display animation in accordance with zoom, pan and tilt information from said live video insertion system; and,
   a mixing means for mixing said resized statistic display animation into said broadcast video using an occlusion mask from said live video insertion system to make the inserted animation appear to be an actual part of the event.

6. A method of placing event related information into a video broadcast so that said event related information does not interfere with or obscure a primary action of interest in said broadcast, comprising the steps of:
   using a live video insertion system to identify a location and measure image motion in said video broadcast;
   generating an animation capable of displaying said event related information;
   obtaining said event related information;
   utilizing the obtained event information to select or create an output display information animation; and,
   mixing said output display information animation into said broadcast video using only the occlusion processing of said live video system so that the output display information animation stays fixed with respect to the viewer's television screen, but does not obscure said primary action of interest.

7. A method of placing event related information into a video broadcast so that said event related information does not interfere with or obscure a primary action of interest in said broadcast, comprising the steps of:
   using a live video insertion system to identify a location and measure image motion in said video broadcast;
   generating an animation capable of displaying said event related information;
   obtaining said event related information;
   utilizing the obtained event information to select or create an output display information animation; and,
   mixing said output display information animation into said broadcast video using information from said live video insertion system including resizing said output display information animation so that said output display information does not obscure said primary action of interest.

8. A method of placing event related information into a video broadcast so that said event related information does not interfere with or obscure a primary action of interest in said broadcast, comprising the steps of:
   using a live video insertion system to identify a location and measure image motion in said video broadcast;
   generating an animation capable of displaying said event related information;
   obtaining said event related information;
   utilizing the obtained event information to select or create an output display information animation; and,
   mixing said output display information animation into said broadcast video using information from said live video insertion system including turning off said output display information animation so that said output display information does not obscure said primary action of interest.

9. A method of placing event related information into a video broadcast so that said event related information does not interfere with or obscure a primary action of interest in said broadcast, comprising the steps of:
   using a live video insertion system to identify a location and measure image motion in said video broadcast;
   generating an animation capable of displaying said event related information, said animation including a set of mid-sequence animations capable of displaying said event related information, a first core animation sequence which is used prior to said mid-sequence animation; a second core animation sequence which is used after said mid-sequence animation;
   obtaining said event related information;
   combining said first core animation, an appropriate mid-sequence animation and said second core animation into an output display information animation in response to said obtained event information; and,
   mixing said output display information animation into said broadcast video using information from said live video insertion system.

10. The method of claim 9 in which said second core animation sequence is identical to said first core animation sequence, but whose frames are displayed in reverse order.

11. The method of claim 9 which said mid-sequence animation is created while said first core animation is being displayed.

12. The method of claim 9 in which step of combining comprises combining multiple sequences of said first core animation sequence.

13. An apparatus for placing displaying one or more event related information statistics into a video broadcast so that said event related information does not interfere with or obscure the primary action of interest in said broadcast comprising:
   a live video insertion system to identify a location and measure image motion in said video broadcast;
   a mid-sequence generating means for generating a set of mid-sequence animations capable of displaying said event related information;
   a first core generating means for generating a first core animation sequence which is used prior to said mid-sequence animation;
   a second core generating means for generating a second core animation sequence which is used after said mid-sequence animation;
   an obtaining means for obtaining said event related information;
   a combining means for combining said first core animation, an appropriate mid-sequence animation and said second core animation into said output display information animation in response to said obtained event information and,
   a mixing means for mixing said output display information animation into said broadcast video using information from said live video insertion system.

* * * * *